(12) United States Patent
Weaver et al.

(10) Patent No.: US 9,670,923 B2
(45) Date of Patent: Jun. 6, 2017

(54) WIPER SEAL ASSEMBLIES FOR A RECIPROCATING PUMP AND METHODS RELATING THERETO

(71) Applicant: National Oilwell Varco, L.P., Houston, TX (US)

(72) Inventors: Randall Ferrain Weaver, McAlester, OK (US); Clifton Dee Eggleston, McAlester, OK (US)

(73) Assignee: National Oilwell Varco, L.P., Houston, TX (US)

( * ) Notice: Subject to any disclaimer, the term of this patent is extended or adjusted under 35 U.S.C. 154(b) by 18 days.

(21) Appl. No.: 14/536,272

(22) Filed: Nov. 7, 2014

(65) Prior Publication Data
US 2016/0131131 A1 May 12, 2016

(51) Int. Cl.
| | | |
|---|---|---|
| *F04B 53/14* | (2006.01) | |
| *F16J 15/18* | (2006.01) | |
| *F04B 53/16* | (2006.01) | |
| *F04B 1/04* | (2006.01) | |
| *F04B 53/02* | (2006.01) | |

(52) U.S. Cl.
CPC .......... *F04B 53/143* (2013.01); *F04B 1/0408* (2013.01); *F04B 53/02* (2013.01); *F04B 53/164* (2013.01); *F16J 15/186* (2013.01)

(58) Field of Classification Search
CPC ...... F04B 1/0408; F04B 53/02; F04B 53/143; F04B 53/164; F16J 9/06; F16J 9/061; F16J 9/12; F16J 15/186
See application file for complete search history.

(56) References Cited

U.S. PATENT DOCUMENTS

| | | | | |
|---|---|---|---|---|
| 1,960,927 A | * | 5/1934 | Siegert ................... | F16J 15/186 184/26 |
| 5,897,119 A | * | 4/1999 | McMillen ............ | F16J 15/3236 277/562 |
| 2011/0239856 A1 | * | 10/2011 | Tiller ...................... | F04B 53/18 92/153 |

OTHER PUBLICATIONS

Excluders Product Guide: Macrotech Polyseal, Inc, Printed Jan. 2002, p. 10.*
Parker Seal Group, Parker Seals Catalogue, PPD 3600, Parker Rod Wiper/Scrapers, Jul. 1, 1989, 20 pages.
Canadian Patent Application No. 2,875,424 Office Action dated Jan. 25, 2016 (3 pages).
Canadian Patent Application No. 2,875,424 Office Action dated Sep. 15, 2016 (4 pages).

* cited by examiner

*Primary Examiner* — Logan Kraft
(74) *Attorney, Agent, or Firm* — Conley Rose, P.C.

(57) ABSTRACT

A wiper seal assembly for a reciprocating pump, the pump including a power section configured to be powered by a motor, a fluid section having an inlet and an outlet, and a plunger having a longitudinal plunger axis, a first end coupled to the power section, and a second end opposite the first end and disposed within the fluid section. The wiper seal assembly includes a cover mounted to the power section. In addition, the wiper seal assembly includes a first wiper seal radially disposed between the cover and the plunger. Further, the wiper seal assembly includes a splash guard disposed about the plunger and axially spaced from the cover. Still further, the wiper seal assembly includes a biasing member axially biasing the splash guard away from the first wiper seal.

12 Claims, 5 Drawing Sheets

WIPER SEAL ASSEMBLIES FOR A RECIPROCATING PUMP AND METHODS RELATING THERETO

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The disclosure relates generally to reciprocating pumps. More particularly, the disclosure relates to wiper seals and related assemblies for restricting fluid leakage from one or both the fluid section and the power section of a reciprocating pump.

Reciprocating pumps typically include a power end or section that drives the reciprocal translation of a plunger or shaft to pressurize fluid within a fluid end or section. During these operations, one end of the plunger is disposed within the power section, while the opposite end of the plunger is disposed within the fluid section. Therefore, a potential leak path exists along the plunger into and out of the power section as well as into and out of the fluid section. Leakage either to or from the fluid section or to or from the power section is undesired and even detrimental to the performance of the reciprocating pump. As a result, various seal assemblies are installed about the plunger to prevent or at least restrict the migration of fluids or other contaminants into and/or out of the power section, the fluid section or both during pumping operations.

BRIEF SUMMARY OF THE DISCLOSURE

Some embodiments are directed to a reciprocating pump. In one embodiment, the reciprocating pump includes a power section configured to be powered by a motor, a fluid section having an inlet and an outlet, and a plunger having a longitudinal plunger axis, a first end coupled to the power section, and a second end opposite the first end and disposed within the fluid section. In addition, the reciprocating pump includes a wiper seal assembly that includes a cover mounted to the power section and a first wiper seal radially disposed between the cover and the plunger. In addition, the wiper seal assembly includes a splash guard disposed about the plunger and axially spaced from the cover. Further, the wiper seal assembly includes a biasing member axially biasing the splash guard away from the first wiper seal.

Other embodiments are directed to a wiper seal assembly for a reciprocating pump. In an embodiment, the wiper seal assembly includes a cover that is configured to be disposed about a plunger of the reciprocating pump, the plunger having a longitudinal plunger axis. In addition, the wiper seal assembly includes a first wiper seal configured to be disposed radially between the cover and the plunger to thereby restrict fluid flow along the plunger. Further, the wiper seal assembly includes a splash guard disposable about the plunger, wherein the splash guard is configured to deflect fluids emitted from the fluid section away from the plunger. Still further, the wiper seal assembly includes a biasing member configured to bias the splash guard axially away from the cover and first wiper seal along the plunger axis when the cover, first wiper seal, and splash guard are installed about the plunger.

Still other embodiments are directed to a method for restricting fluid flow along a plunger of a reciprocating pump, the reciprocating pump including a power section, a fluid section spaced from the power section, and a plunger extending along a longitudinal plunger axis from the power section and into the fluid section. In an embodiment, the method includes restricting fluid flow along the plunger both into and out of the power section with a first wiper seal. In addition, the method includes deflecting fluids emitted from the fluid section along the plunger away from the plunger with a splash guard. Further, the method includes biasing the splash guard axially away from the first wiper seal along the plunger axis.

Embodiments described herein comprise a combination of features and advantages intended to address various shortcomings associated with certain prior devices, systems, and methods. The foregoing has outlined rather broadly the features and certain technical advantages of the disclosed exemplary embodiments in order that the detailed description that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the embodiments described herein.

BRIEF DESCRIPTION OF THE DRAWINGS

For a detailed description of the disclosed exemplary embodiments, reference will now be made to the accompanying drawings in which.

DETAILED DESCRIPTION

Figure 1:
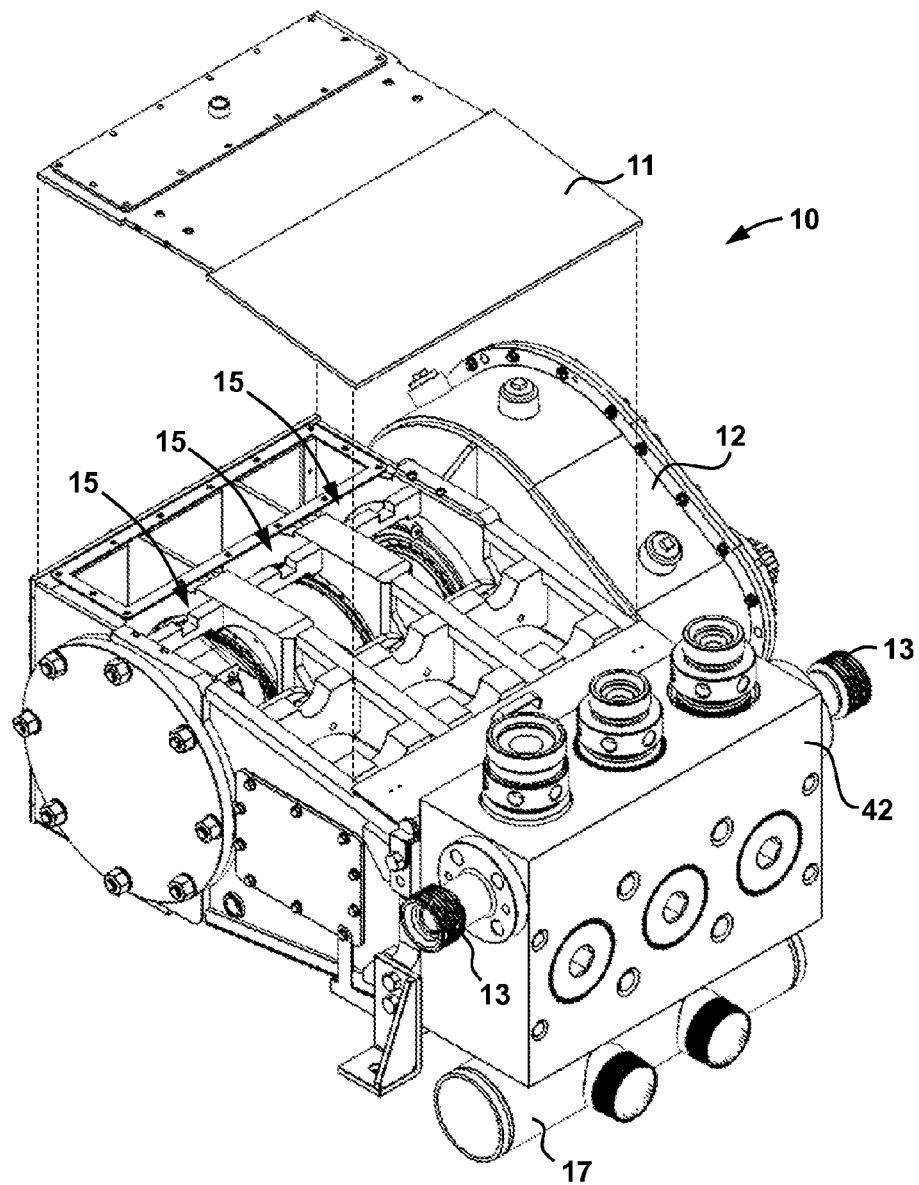
FIG. 1 is a perspective view of an embodiment of a reciprocating pump including a wiper seal assembly in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As previously described, seal assemblies are typically installed about the plunger of a reciprocating pump to prevent or at least restrict the migration of fluids or other contaminants into and/or out of the power section, the fluid section or both. Such restriction is desirable since contaminants that migrate into the power section can interfere with and potentially damage the internal components of the power section during pumping operations. In addition, the leakage of fluid (e.g., lubricant) out of the power section can cause an increase in friction between the various moving components housed within the power section, thereby again causing damage to the same. Thus, embodiments disclosed herein include wiper seal assemblies for use within a reciprocating pump to restrict fluid flow into and out of the power section during pumping operations.

In addition, in many reciprocating pumps, mechanism packing assembly is installed for preventing or at least restricting the migration of fluids out of the fluid section along the plunger. Over time these assemblies wear and thus, lose their ability to restrict fluid leaks from the fluid section. As a result, regular maintenance and replacement of the packing assembly is necessary to ensure the ongoing proper operation of the corresponding reciprocating pump. However, due to the limited spacing within many such pumps, it is normally necessary to remove a number of other components within the pump in order to gain access to the packing assembly. Thus, embodiments of the wiper seal assemblies disclosed herein are arranged such that the procedure for access and removal of the packing assemblies within the corresponding reciprocating pump is greatly simplified as compared to conventional systems.

Referring now to FIG. 1, there is shown a reciprocating pump 10 including a wiper seal assembly (not directly shown in FIG. 1) in accordance with the principles disclosed herein. In this embodiment, pump 10 is utilized to pump fluids from the surface into a subterranean wellbore or borehole in order to carry out downhole operation, such as, for example, cementing or formation fracturing; however, it should be appreciated that pump 10 may be utilized in a wide array of industries and applications while still complying with the principles disclosed herein. Pump 10 includes a motor 12 that provides rotative power to a plurality of pumping units 15 arranged adjacent one another within pump 10 (note: a top cover plate 11 is shown withdrawn from the pump 10 in FIG. 1 to reveal the pumping units 15 disposed therein). In this embodiment, pump 10 includes a total of three (3) pumping units 15 that are each energized by motor 12 to draw in fluid from a suction manifold 17 and discharge the same from a pair of outlet ports 13.

Figure 2:
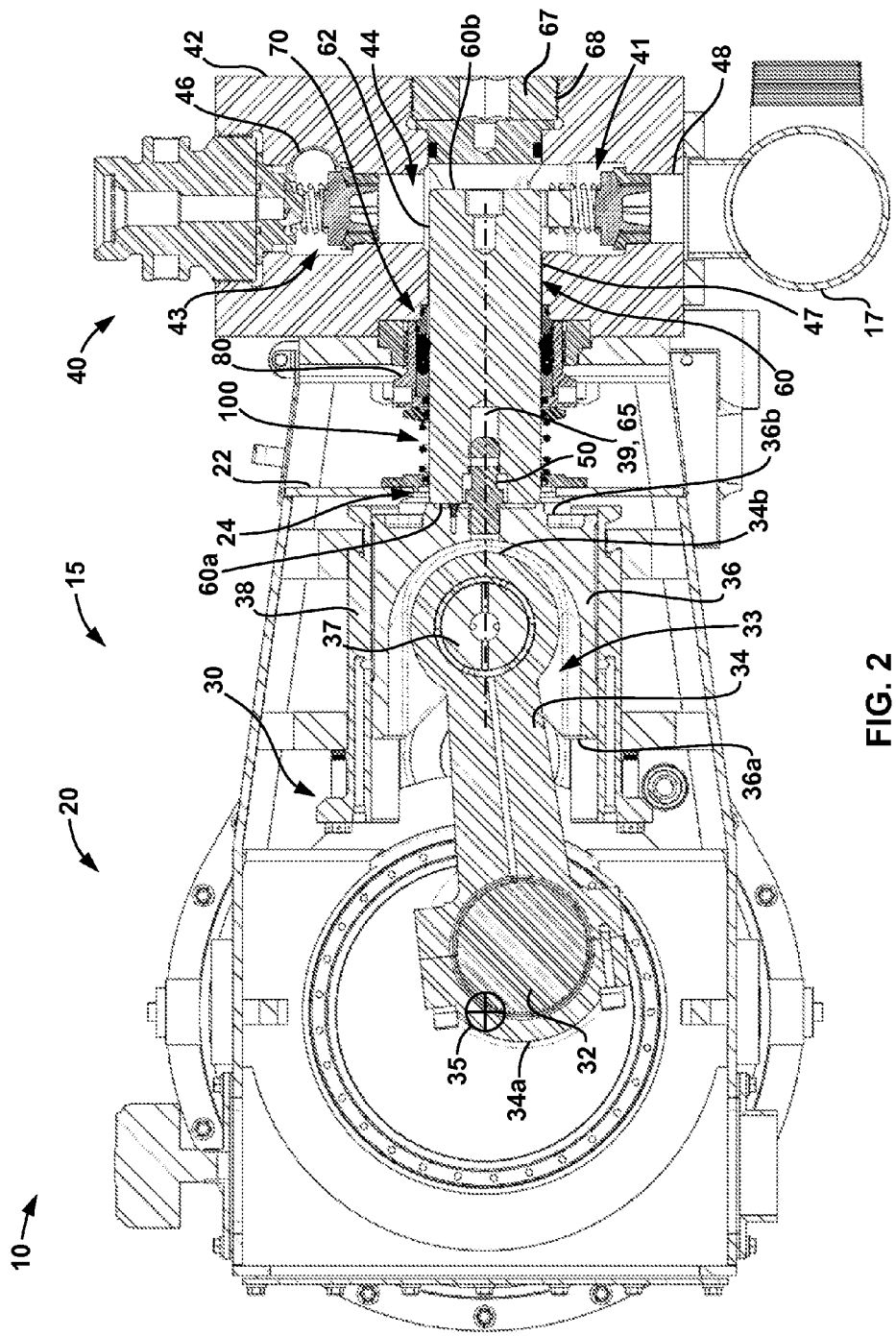
FIG. 2 is a cross-sectional view of a single pumping unit disposed within the reciprocating pump of FIG. 1.

Referring now to FIG. 2, each pumping unit 15 of pump 10 includes a power side or section 20, a fluid end or section 40, a plunger 60 extending between sections 20, 40, and a wiper seal assembly 100 disposed about plunger 60 between sections 20, 40 (note: while only one pumping unit 15 of pump 10 is shown in FIG. 2, it should be appreciated that each such pumping unit 15 is similarly arranged). Power section 20 includes a cranking mechanism 30 that further includes a crankshaft 32, a connecting rod 34, and a crosshead 36. Crankshaft 32 is operably connected to motor 12 such that actuation of the motor 12 forces crankshaft 32 to rotate about a crankshaft axis 35. Crosshead 36 is slidably disposed within a sleeve 38 and includes a central axis 39, a first or open end 36a, and a second or closed end 36b opposite open end 38a, and a cavity 33 extending axially from the open end 36a. Connecting member 34 is an elongate component that operably connects crankshaft 32 to crosshead 36. In particular, connecting member 34 includes a first end 34a and a second end 34b that is opposite first end 34a. First end 34a is pivotably coupled to crankshaft 32 while second end 34b is inserted within cavity 33 and pivotably coupled to crosshead with a wrist pin 39.

Plunger 60 is an elongate cylindrical member that has a central longitudinal plunger axis 65, a first or power end 60a a second or fluid end 60b opposite the power end 60a, and a radially outer surface 62 extending axially between ends 60a, 60b. Power end 60a extends through an aperture or access port 24 within an outer wall 22 enclosing power section 20 and is connected to closed end 36b of crosshead 36 such that axes 39, 65 are aligned within one another. In particular, plunger 60 is secured to crosshead 36 with a head bolt 50 that is threadably connected to each of the closed end 36b of crosshead 36 and the power end 60a of plunger 60.

Fluid section 40 includes a main body 42 that defines an inner chamber 44 that further includes an inlet 48 in communication with manifold 17, an outlet 46 in communication with one or both of the outlet ports 13 (See FIG. 1), and an access port 47. A suction valve assembly 41 is disposed within chamber 44, proximate the inlet 48 and is configured to control fluid flow from the manifold 17, through inlet 48, and into chamber 44. In addition, a discharge valve assembly 43 is disposed within chamber 44, proximate the outlet 46 and is configured to control fluid flow from chamber 44 to the outlet ports 13, through outlet 46.

Referring now to FIGS. 1 and 2, motor 12 simultaneously imparts rotative energy to each of the pumping units 15 to facilitate pumping operations from pump 10, with each of the pumping units 15 in this embodiment operating approximately 120° out of phase with one another to produce a relatively constant supply of pressurized fluid from outlet ports 13. Specifically, considering the operations of only the single pumping unit 15 shown in FIG. 2, fluid end 60 of plunger 60 is inserted through access port 47 and is disposed within chamber 44. Thereafter, the motor 12 drives crankshaft 32 to rotate about axis 35, which in turn causes first end 34a of connecting rod 34 to also rotate about axis 35 and causes second end 34b of rod 34 and crosshead 36 to reciprocate back and forth within sleeve 38 along axis 39. Due to the connection of power end 60a of plunger 60 and closed end 36b of crosshead 36 with head bolt 50, as crosshead 36 reciprocates along axis 39 within sleeve 38, plunger 60 is also forced to reciprocate along the axis 65 thereby causing fluid end 60b to reciprocate in and out of chamber 44.

Each time fluid end 60b of plunger strokes out of chamber 44 (i.e., toward the left as shown in FIG. 1), a vacuum is created therein which causes discharge valve assembly 43 to close and suction valve assembly 41 to open, thereby drawing fluid from a suction manifold 17, through inlet 41, and into chamber 44. Conversely, each time fluid end 60b strokes into chamber 44 (i.e., to the right as shown in FIG.

1), the pressure of the fluid within chamber 44 increases, which causes suction valve assembly 41 to close and discharge valve assembly 43 to open, thereby forcing the pressurized fluid to flow out of chamber 44, through outlet 46, and into one or both of the outlet ports 13 (See FIG. 1).

During the operation of each pumping unit 15 within pump 10, pressurized fluid is primarily restricted from flowing out of chamber 44 along the radially outer surface 62 of plunger 60 through access port 47 with a packing assembly 70 that is disposed about plunger 60. Packing assembly 70 is secured within pump 10 with a threaded gland nut 80 that is also concentrically disposed about plunger 60. In addition, as will be described in more detail below, during these operations, fluids are restricted from entering and exiting from power section 20 along the radially outer surface 62 of plunger 60 with the wiper seal assembly 100.

Figure 3:
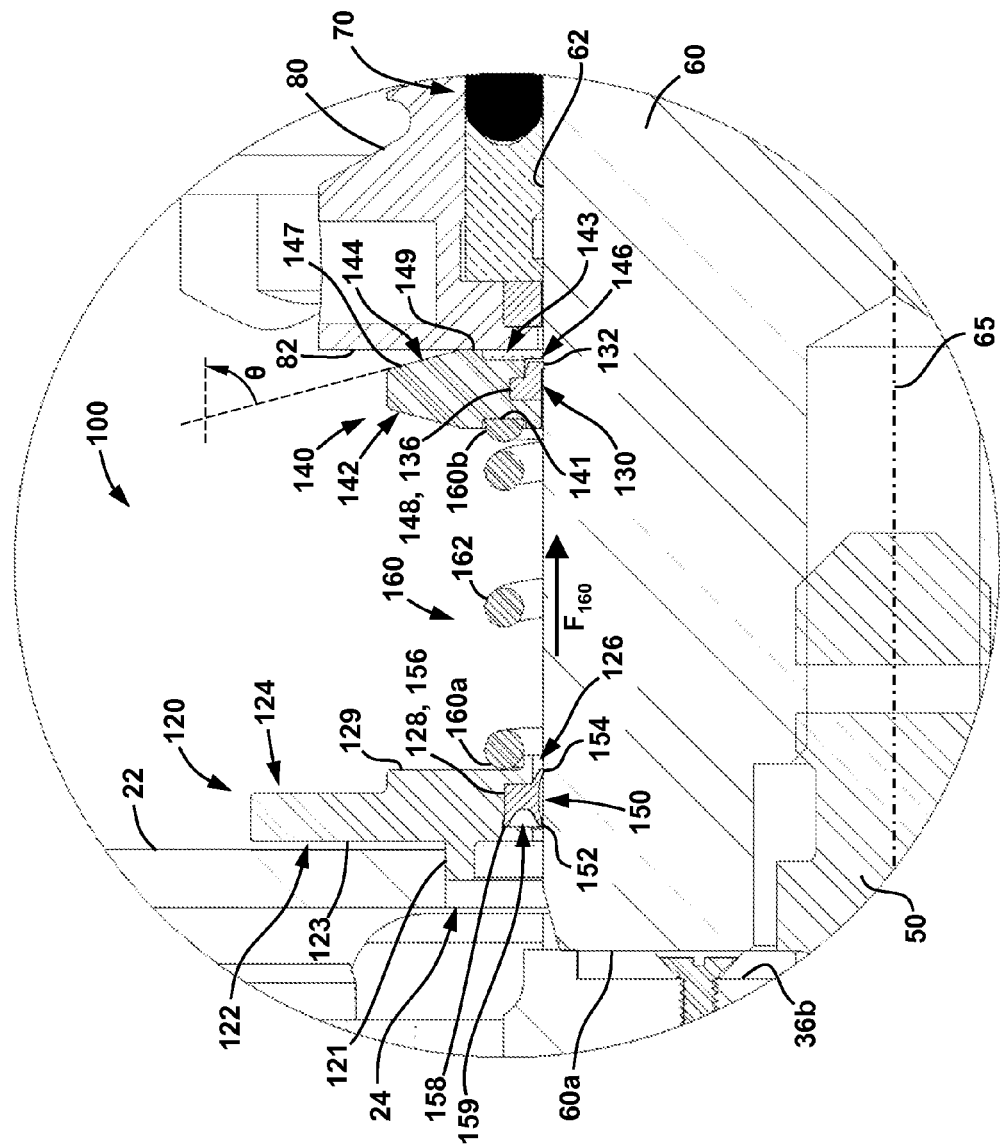
FIG. 3 is an enlarged cross-sectional view of the wiper seal assembly for use within the pumping unit of FIG. 2.

Referring now to FIG. 3, in this embodiment wiper seal assembly 100 generally includes a wiper box cover 120, a first or primary wiper seal 150, a biasing member 160, a splash guard 140, and a second or secondary wiper seal 130. Each of these components will be described in more detail below. For convenience, reference will also be made to FIG. 4, which shows an exploded view of the components of wiper seal assembly 100 (e.g., cover 120, seals 150, 130, biasing member 160, and splash guard 140) arranged along the central plunger axis 65. While only a single wiper seal assembly 100 is shown in FIGS. 3 and 4, each such wiper seal assembly 100 included within the other pumping units 15 of pump 10 are configured the same.

Figure 4:
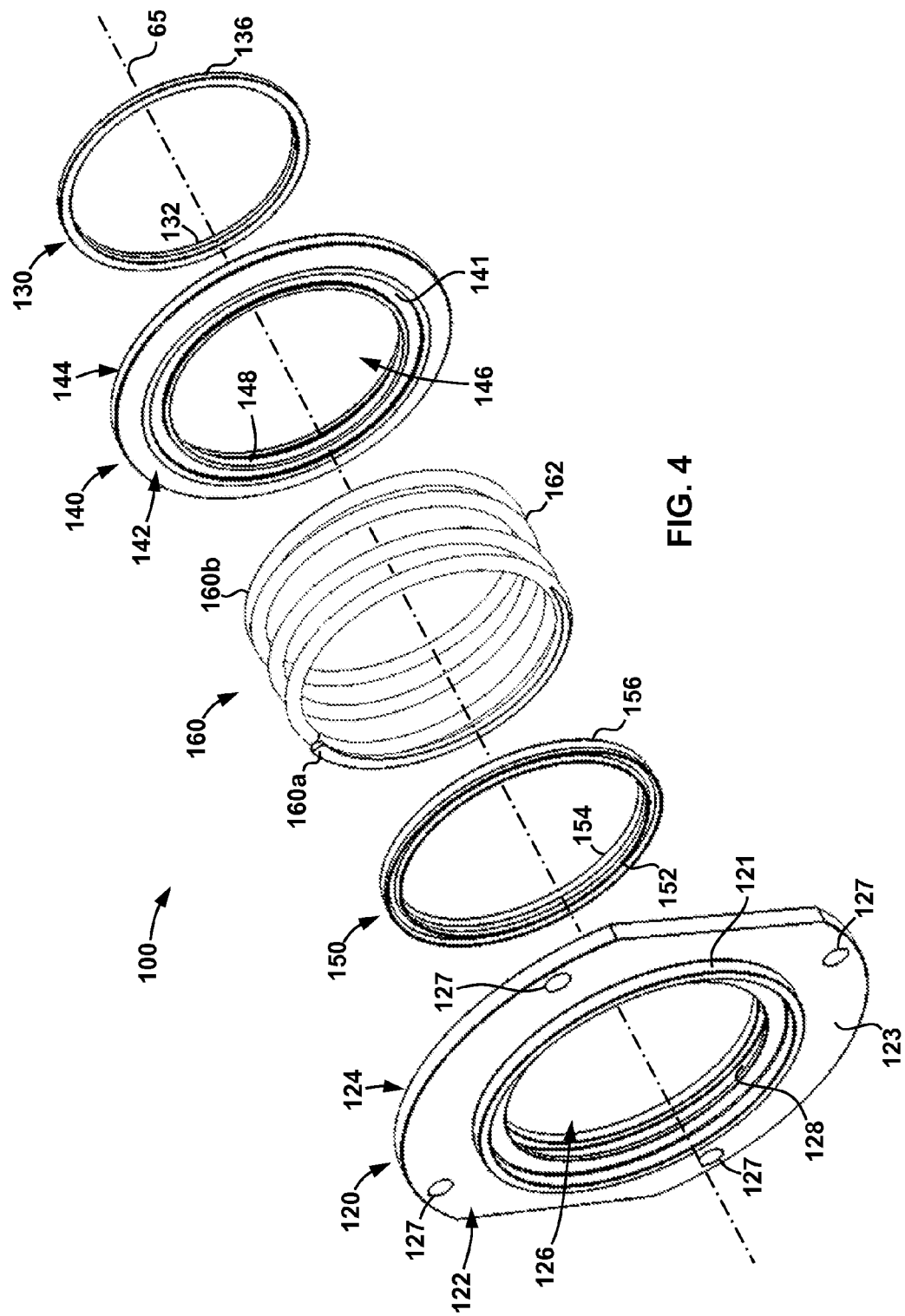
FIG. 4 is an exploded perspective view of the wiper seal assembly of FIG. 3.

Referring still to FIGS. 3 and 4, wiper box cover 120 includes a first or power section facing side 122, a second or fluid section facing side 124, and a central aperture or throughbore 126 extending between sides 122, 124. Power section facing side 122 includes an annular planar engagement surface 123 and an axially oriented annular lip 121, and fluid section facing side 124 includes an annular planar bearing surface 129. An annular recess 128 extends radially from throughbore 126 and, as will be described in more detail below, is configured to receive primary wiper seal 150 during assembly. In addition, as is best shown in FIG. 4, cover 120 includes a plurality of attachment apertures 127 extending axially between sides 122, 124. During installation of assembly 100 within pumping unit 15, cover 120 is secured to outer wall 22 of power section 20 by aligning the attachment apertures 127 with corresponding apertures (not shown) in wall 22 and inserting suitable attachment members (e.g., bolts, rivets, nails, pins, etc.) therethrough. Further, when cover 120 is secured to wall 22 in the manner described, lip 121 is inserted within access port 24 such that cover 120 is aligned with axis 39 of crosshead 36 within power section 20 (which is further aligned with axis 65 of plunger 60 during operations as previously described).

Primary wiper seal 150 is a ring-shaped member that is disposed or retained within the annular recess 128 of cover 120 during operations. In this embodiment, seal 150 generally includes an outer annular surface 156, a first annular sealing surface 152, and a second annular sealing surface 154. In some embodiments, primary wiper seal 150 is an H-Type wiper seal such as those available from Parker Seals located in Salt Lake City, Utah or those available from Turpen & Associates, LLC located in Tulsa, Okla. In addition, in this embodiment, primary seal 150 includes a biasing member 158 that forms a portion of outer annular surface 156. An annular notch or recess 159 extends axially within seal 150 and is radially disposed between biasing member 158 and sealing surface 152. As shown in FIG. 3, outer annular surface 156 on primary wiper seal 150 abuts or engages with recess 128 on cover 120 such that seal 150 is radially disposed between cover 120 and plunger 60 and sealing surfaces 152, 154 are axially separated from one another with respect to plunger axis 65. In addition, when seal assembly 100 is fully installed within pumping unit 15, each of the first and second annular sealing surface 152, 154, respectively, engage with radially outer surface 62 of plunger 60 such that fluid flow along plunger 60 within throughbore 126 of cover 120 is restricted by the engagement of sealing surfaces 152, 154 and surface 62 of plunger 60 during pumping operations. Specifically, fluid flow along plunger 60 within throughbore 126 from power section 20 toward fluid section 40 (i.e., from left to right as shown in FIG. 2) is restricted by the engagement of annular sealing surface 152 and surface 62, while fluid flow along plunger 60 within throughbore 126 from fluid section facing side 124 toward power section 20 (i.e., from right to left as shown in FIG. 2) is restricted by the engagement of annular sealing surface 154 and surface 62. In this embodiment, the above described engagement between surfaces 152, 154 of seal 150 and outer surface 62 of plunger 60 is further enhanced by the bias provided by member 158. Specifically, without being limited to this or any other theory, when seal 150 is fully installed within pumping unit 15, biasing member 158 is deflected radially toward sealing surface 152 as a result of the engagement of recess 128 and annular outer surface 156 which thereby results in a radially oriented reaction force that effectively drives surfaces 152, 154 into engagement with surface 62 on plunger 60. Further, in some embodiments, sealing members (e.g., seal glands) (not shown) are disposed between lip 121 and port 24 and/or between mating surface 123 and wall 22 in order to restrict fluid flow into and out of power section 20 between cover 120 and wall 22 and port 24.

Referring still to FIGS. 3 and 4, splash guard 140 includes a first or power section facing side 142, a second or fluid section facing side 144, and a central aperture or throughbore 146 extending between sides 142, 144. As best shown in FIG. 3, in this embodiment power section facing side 142 includes an annular recess 141, and fluid section facing side 144 includes an annular engagement surface 149, an annular channel or recess 143 extending axially from the surface 149, and a splash surface 147 extending from engagement surface 149. In this embodiment, splash surface 147 is a frustoconical surface that extends outward from plunger 60 at an angle θ relative to plunger axis 65. In some embodiments, the angle θ preferably ranges from 0° to 90°, and more preferably ranges from 75° to 90°. Thus, splash surface 147 may be referred to herein as an annular angled splash surface. As will be described in more detail below, during pumping operations, splash surface 147 deflects fluids emitted from fluid section 40 away from the plunger axis 65 (e.g., at the angle θ), thus preventing their impact with cover 120 and seal 150. In addition, in this embodiment, splash guard 140 includes an annular recess 148 extending radially from throughbore 146. As will be described in more detail below, recess 148 is configured to receive secondary wiper seal 130 therein.

Secondary wiper seal 130 is a ring-shaped member that is disposed or retained within the annular recess 148 of splash guard 140 during operations. In this embodiment, seal 130 includes an outer annular engagement surface 136, and an annular sealing surface 132. In some embodiments, secondary wiper seal 130 is an AN type wiper seal such as the AN41 available from Turpen & Associates, LLC located in Tulsa, Okla. As shown in FIG. 3, outer annular surface 136 on secondary wiper seal 130 abuts or engages with recess 148 on splash guard 140 such that seal 130 is radially disposed between guard 140 and plunger 60 during operations with respect to plunger axis 65. In addition, when seal assembly 100 is fully installed within pump 10, the annular sealing surface 132 engages with radially outer surface 62 of plunger 60. Thus, during pumping operations, axial fluid flow along plunger 60 within throughbore 146 of splash guard 140 both toward and away from fluid section 40 (i.e., both from left to right and right to left, respectively, as shown in FIG. 2) is restricted by the engagement of sealing surface 132 and radially outer surface 62 of plunger 60.

Referring still to FIGS. 3 and 4, biasing member 160 is disposed axially between cover 120 and splash guard 140 such that biasing member 160 biases guard 140 axially away from cover 120 when seal assembly 100 is fully installed within pumping unit 15. In this embodiment, biasing member 160 comprises a coiled spring having a first or power section facing end 160a, a second or fluid section facing end 160b, and a body 162 extending helically between the ends 160a, 160b about central axis 65 of plunger 60. As shown in FIG. 2, power section facing end 160a is engaged with bearing surface 129 on cover 120 while fluid section facing side 160b is received within recess 148 on splash guard 140. Because cover 120 is fixed to wall 22 as previously described, biasing member 160 exerts a biasing force $F_{160}$ that urges or biases annular engagement surface 149 on splash guard 140 into engagement with a corresponding planar engagement surface 82 on gland nut 80.

Referring now to FIGS. 2 and 3, during pumping operations, as plunger 60 reciprocates along the axes 65, 39 as previously described, plunger 60 also reciprocates relative to seal assembly 100. In particular, as fluid end 60b of plunger 60 reciprocates into and out of chamber 44, the radially outer surface 62 slides against each of the sealing surfaces 152, 154 on primary wiper seal 150 and sealing surface 132 on secondary wiper seal 130, thereby creating dynamic seals between surfaces 152, 154, 132 and radially outer surface 62. Thus, as previously described, during reciprocation of plunger 60, fluids within power section 20 (e.g., lubricant) are prevented from flowing out of port 24 between throughbore 126 of cover 120 and the radially outer surface 62 of plunger 60 due to the engagement of annular sealing surface 152 and surface 62. In addition, during reciprocation of plunger 60, fluids outside of the power section 20 are prevented from flowing into port 24 between throughbore 126 of cover 120 and the radially outer surface 62 due to the engagement of annular sealing surface 154 and surface 62.

Figure 5:
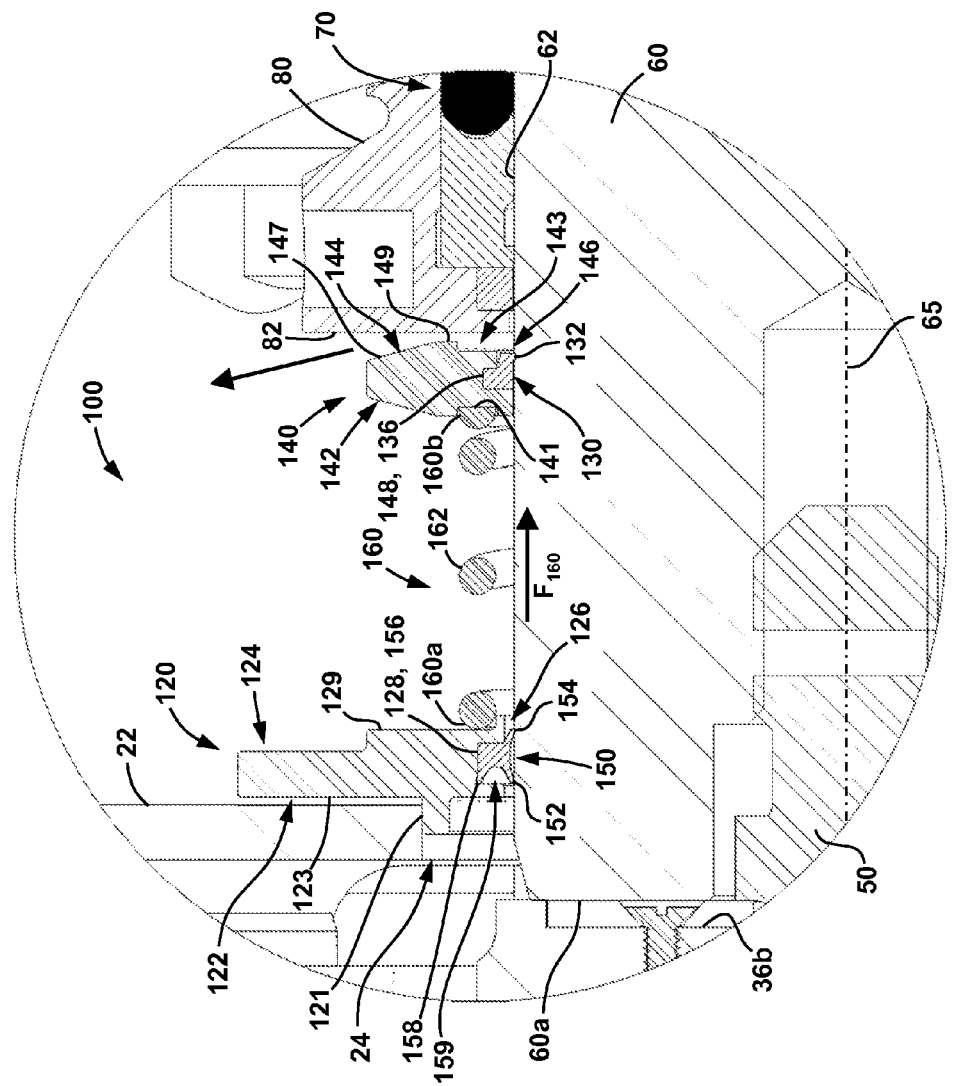
FIG. 5 is an enlarged cross-sectional view the wiper seal assembly of FIG. 3 deflecting fluids leaked from the fluid end of the pumping unit of FIG. 2.

Referring now to FIG. 5, as previously mentioned, during pumping operations, fluids (e.g., cement, fracking fluid) within chamber 44 of fluid section 40 are restricted from flowing out of chamber 44 by packing assembly 70. However, if the sealing capabilities of packing assembly 70 should become diminished due to, for example wear and tear caused by operation of pump 10, fluid may escape chamber 44 between the radially outer surface 62 and gland nut 80 until it reaches the recess 143 in splash guard 140. Additional fluid flow between radially outer surface 62 and throughbore 146 is then prevented due to the engagement of annular sealing surface 132 with surface 62. As a result, the leaked fluid exerts a pressure both on surface 82 of gland nut 80 and recess 143 of splash guard 140 which can overcome the biasing force $F_{160}$ exerted by member 160 and urges splash guard 140 and end 160b of member 160 toward the power section 20 (i.e., toward the left as shown in FIGS. 2 and 5). As splash guard 140 translates toward power section 20, the fluid leaked from chamber 44 is directed or deflected away from plunger 60, cover 120, and member 160 (e.g., at the angle θ). Thus, in the event of a leak from fluid section 40 (particularly chamber 44), the escaping fluid is directed away from seal 150, thus reducing the likelihood that such leaked fluid will impact and damage the seal between primary seal 150 and surface 62 of plunger 60 during pumping operations.

Referring again to FIGS. 2 and 3, as previously mentioned above, eventually it will become necessary to service or replace the packing assembly 70. To accomplish this, a plug 67 is removed from a port 68 in body 42 and plunger 60 is disconnected (e.g., unthreaded) from head bolt 50 and withdrawn through port 68. Thereafter, biasing member 160, splash guard 140, and secondary seal 130 may simply be removed by depressing end 160b of member 160 back toward cover 120, thereby releasing guard 140 from engagement with gland nut 80. Finally, with biasing member 160, guard 140, and seal 130 removed, there is sufficient room and clearance for gland nut 80 to be unthreaded and removed from pump 10 in order to expose packing assembly 70 for subsequent removal and/or servicing. Thus, as opposed to a conventional system, which would typically require the removal of the entire wiper seal assembly to allow removal of the gland nut 80, use of a wiper seal assembly 100 in accordance with the principles disclosed herein allows an operator to remove and/or service the packing assembly by only removing a portion of assembly 100 (e.g., member 160, guard 140, and seal 130), which greatly decreases the time and expense required to carry out such an operation.

In the manner described, through use of a wiper seal assembly in accordance with the principles disclosed herein (e.g., assembly 100), fluid flow both into and out of the power section (e.g., section 20) of a pumping unit (e.g., unit 15) within a reciprocating pump (e.g., pump 10) is restricted, thus minimizing the risk of damage often caused to internal components of the power section due to uncontrolled fluid migration therein. In addition, through use of a wiper seal assembly in accordance with the principles disclosed herein (e.g., assembly 100), the procedure for accessing the packing assembly (e.g., packing assembly 70) for replacement and/or maintenance of the same is greatly simplified as compared to conventional systems.

While certain exemplary embodiments have been shown and described, modifications thereof can be made by one of ordinary skill in the art without departing from the scope or teachings herein. For example, while pump 10 has been shown and described to include a total of three pumping units 15, it should be appreciated that in other embodiments more or less than three total pumping units 15 may be included while still complying with the principles disclosed herein. As another example, while the biasing member 160 has been shown and described herein as a coiled spring, it should be appreciated that in other embodiments, biasing member 160 may comprise any suitable member for biasing one member away from another along a common central axis (e.g., axis 65) while still complying with the principles disclosed herein, such as, a leaf spring, a hydraulic cylinder, etc. As still another example, in some embodiments, no secondary seal 130 is included with assembly 100. As a result, in at least some of these embodiments, splash guard 140 therefore does not include the radially extending annular recess 148. Thus, the embodiments described herein are exemplary only and are not limiting.

In addition, many other variations and modifications of the systems, apparatus, and processes described herein are possible and are within the scope of this disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A reciprocating pump, comprising:
   a power section configured to be powered by a motor;
   a fluid section having an inlet and an outlet;
   a plunger having a longitudinal plunger axis, a first end coupled to the power section, and a second end opposite the first end and disposed within the fluid section;
   a wiper seal assembly, including:
      a cover mounted to the power section;
      a first wiper seal radially disposed between the cover and the plunger;
      a splash guard disposed about the plunger and axially spaced from the cover; and
      a biasing member axially biasing the splash guard away from the first wiper seal, wherein the splash guard is axially movable toward the cover along the longitudinal plunger axis in response to a leaked fluid exerting a pressure on the splash guard that overcomes a biasing force exerted by the biasing member on the splash guard.

2. The reciprocating pump of claim 1, wherein the first wiper seal includes a first sealing surface configured to restrict fluid flow along the plunger into the power section; and a second sealing surface configured to restrict fluid flow along the plunger out of the power section.

3. The reciprocating pump of claim 2, wherein the first sealing surface is axially spaced from the second sealing surface along the plunger axis.

4. The reciprocating pump of claim 3, wherein the first wiper seal further includes a second biasing member that is configured to radially bias the first sealing surface and the second sealing surface into engagement with the plunger.

5. The reciprocating pump of claim 4, wherein the first wiper seal is an H-type wiper seal.

6. The reciprocating pump of claim 2, wherein the biasing member is a coiled spring having a body that extends helically about the plunger axis.

7. The reciprocating pump of claim 6, wherein the body of the biasing member has a first end abutting the cover and a second end abutting the splash guard.

8. The reciprocating pump of claim 1, wherein the splash guard includes an annular angled splash surface configured to deflect fluid emitted from the fluid section away from the plunger.

9. The reciprocating pump of claim 8, wherein the annular angled splash surface is angled between 75° and 90° relative to the plunger axis.

10. The reciprocating pump of claim 1, further comprising a second wiper seal radially disposed between the splash guard and the plunger, the second wiper seal being engaged with the plunger.

11. The reciprocating pump of claim 10, wherein the second wiper seal has a sealing surface that restricts fluid flow along the plunger out from the fluid section.

12. The reciprocating pump of claim 11, wherein the second wiper seal is an AN type wiper seal.

* * * * *